United States Patent
Ren et al.

(10) Patent No.: US 8,462,132 B2
(45) Date of Patent: Jun. 11, 2013

(54) METHOD AND IMPLEMENTATION DEVICE FOR INERTIAL MOVEMENT OF WINDOW OBJECT

(75) Inventors: Min Ren, Shenzhen (CN); Qiang Zhang, Shenzhen (CN); Shundong Gao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/574,874

(22) PCT Filed: Jul. 6, 2011

(86) PCT No.: PCT/CN2011/076909
§ 371 (c)(1),
(2), (4) Date: Jul. 24, 2012

(87) PCT Pub. No.: WO2012/003799
PCT Pub. Date: Jan. 12, 2012

(65) Prior Publication Data
US 2012/0306796 A1 Dec. 6, 2012

(30) Foreign Application Priority Data
Jul. 7, 2010 (CN) .......................... 2010 1 0223457

(51) Int. Cl.
*G06F 3/41* (2006.01)

(52) U.S. Cl.
USPC ........................................ 345/173; 345/178

(58) Field of Classification Search
USPC 345/8, 156–179, 589, 629, 633, 672; 463/36; 382/124; 348/77; 200/52 R; 473/154
See application file for complete search history.

(56) References Cited

U.S. PATENT DOCUMENTS

| | | | |
|---|---|---|---|
| 6,617,734 B2 * | 9/2003 | Taniguchi et al. | 310/90.5 |
| 7,832,126 B2 * | 11/2010 | Koellner et al. | 37/348 |
| 2002/0047402 A1 * | 4/2002 | Taniguchi et al. | 310/90.5 |
| 2005/0119063 A1 * | 6/2005 | Tupman et al. | 473/154 |

(Continued)

FOREIGN PATENT DOCUMENTS

| | | |
|---|---|---|
| CN | 101751195 A | 6/2010 |
| RU | 2007110422 A | 9/2008 |
| WO | 2010048051 A2 | 4/2010 |

OTHER PUBLICATIONS

International Search Report in international application No. PCT/CN2011/076909, mailed on Oct. 20, 2011.

(Continued)

*Primary Examiner* — Prabodh M Dharia
(74) *Attorney, Agent, or Firm* — Oppedahl Patent Law Firm LLC (57) ABSTRACT

Provided are a method and an implementation device for inertial movement of a window object, to realize inertial movement effect of a window object based on linear speed and angular speed. When an input device releases a window object being dragged, the initial linear speed and the initial angular speed are obtained, and then the deceleration of linear speed and the deceleration of angular speed are used to obtain quantity of displacement and quantity of rotation corresponding to each processing period; the inertial movement effect of the window object is simulated after the release of a mouse button or the release of a finger from a touch screen. Through the method and device, the inertial movement effect of the window object is realized, thereby facilitating touch operation, enhancing ease of use of terminal software, and improving user experience.

9 Claims, 3 Drawing Sheets

U.S. PATENT DOCUMENTS

| | | |
|---|---|---|
| 2005/0169504 A1* | 8/2005 | Black .......................... 382/124 |
| 2006/0031786 A1 | 2/2006 | Hillis et al. |
| 2006/0092133 A1* | 5/2006 | Touma et al. ................ 345/158 |
| 2006/0119586 A1* | 6/2006 | Grant et al. .................. 345/173 |
| 2006/0192760 A1* | 8/2006 | Moore et al. ................. 345/163 |
| 2007/0125633 A1* | 6/2007 | Boillot ....................... 200/52 R |
| 2007/0146325 A1* | 6/2007 | Poston et al. ................ 345/163 |
| 2007/0236475 A1* | 10/2007 | Wherry ....................... 345/173 |
| 2008/0282583 A1* | 11/2008 | Koellner et al. ................ 37/348 |
| 2009/0058829 A1* | 3/2009 | Kim et al. .................... 345/173 |
| 2009/0073194 A1* | 3/2009 | Ording ........................ 345/672 |
| 2009/0262137 A1* | 10/2009 | Walker et al. ................ 345/629 |
| 2009/0289904 A1* | 11/2009 | Park et al. .................... 345/173 |
| 2009/0303204 A1* | 12/2009 | Nasiri et al. ................. 345/184 |
| 2010/0103118 A1 | 4/2010 | Townsend et al. |
| 2011/0102570 A1* | 5/2011 | Wilf et al. ...................... 348/77 |

OTHER PUBLICATIONS

English Translation of the Written Opinion of the International Search Authority in international application No. PCT/CN2011/076909, mailed on Oct. 20, 2011.

* cited by examiner

METHOD AND IMPLEMENTATION DEVICE FOR INERTIAL MOVEMENT OF WINDOW OBJECT

TECHNICAL FIELD

The present disclosure relates to a design technology for the software operation interface of touch-screen device, in particular to a method and an implementation device for inertial movement of window object.

BACKGROUND

Nowadays, the Internet instant messenger has been accepted by majority of Internet users, and becomes an essential software tool for user. The Internet instant messenger is widely applied to work of users as well as usual leisure and entertainment. Thus, there is a high requirement of ease of use, stability, security and other aspects on the Instant Messaging (IM) software.

With the development of technology, touch products like iPhone are popularized gradually. The design of utilizing inertia to realize materialization is gradually becoming the mainstream.

In the existing design of utilizing inertia to realize materialization, the user can implement, through a linear touch operation, inertia scrolling of contents in a list and webpage at a linear speed, but cannot process the inertia effect based on "angular speed" under the condition of rotation.

SUMMARY

On that account, the present disclosure mainly aims to provide a method and an implementation device for inertial movement of a window object, to realize inertial movement effect of a window object based on linear speed and angular speed.

For achieving the aim, the technical solution of the present disclosure is implemented as follows.

A method for inertial movement of a window object includes:

A: monitoring initial touch operation of an input device, recording initial touch coordinate and touch time, and starting a first timer;

B: in the process of dragging the window object, the first timer periodically triggers an event of obtaining quantity of displacement and quantity of rotation that are generated on a screen by a user through the input device relative to a previous time point, and the obtained quantity of displacement and quantity of rotation are sent to the window object;

C: when the user releases the window object, obtaining initial linear speed and initial angular speed of the window object, and starting a second timer;

D: based on the initial linear speed and the initial angular speed, the second timer periodically triggers an event of obtaining current quantity of displacement and quantity of rotation of the window object according to deceleration of linear speed and deceleration of angular speed, and the obtained current quantity of displacement and quantity of rotation are sent to the window object;

E: when the initial linear speed and the initial angular speed corresponding to current period of the second timer are less than or equal to 0, terminating the process of inertial movement of window object.

Furthermore, in the above-mentioned method, the user may drag, with one or multiple touch points, the window object through the input device;

in the case of multiple touch points, the quantity of displacement and the quantity of rotation may be obtained based on two touch points with smallest device numbers.

Accordingly, the present disclosure further provides a device for inertial movement of a window object, including:

a touch point capturing unit, configured to capture operation that an input device drags the window object on a screen, and generate corresponding control information;

a drag processing unit, configured to realize dragging effect of the window object according to the control information sent from the touch point capturing unit, obtain initial linear speed and initial angular speed when the input device releases the window object, and send the obtained initial linear speed and the initial angular speed to an inertia processing unit; and the inertia processing unit, configured to, based on the initial linear speed and the initial angular speed sent from the drag processing unit, realize inertial movement effect according to deceleration of linear speed and deceleration of angular speed.

Furthermore, the control information generated by the touch point capturing unit may include:

initial control information when the input device initially touches the window object, including position, time, device number, and identity indicating initially touching the window object;

current control information when the input device moves the window object, including position, time, device number, and identity indicating dragging the window object;

release control information when the input device releases the window object, including position, time, device number, and identity indicating releasing the window object.

Furthermore, the drag processing unit may include:

a first movement processing unit, configured to start a first timer when receiving the initial control information sent from the touch point capturing unit, obtain, according to the current control information sent from the touch point capturing unit, quantity of displacement and quantity of rotation of the window object corresponding to current period of the first timer under triggering of the first timer, and send the obtained quantity of displacement and quantity of rotation to the window object; and an initial speed processing unit, configured to obtain the initial linear speed and the initial angular speed after receiving the release control information sent from the touch point capturing unit, and send the obtained initial linear speed and initial angular speed to the inertia processing unit.

With application of the technical solution provided by the present disclosure, the inertial movement effect of the window object based on the linear speed and the angular speed is realized, thereby facilitating operation; through the interface and operation of materialization, the ease of use of the terminal software is enhanced, and the user experience is improved, too.

DETAILED DESCRIPTION

The basic idea of the present disclosure is: performing materialization treatment on the process that the user moves the window object through a mouse or a finger, after the user ends the dragging operation, implementing, according to the linear speed and the angular speed when a dragging button of the mouse is released or the finger is lifted, inertial movement of a moving object through the inertia processing unit.

The moving object in the present disclosure means a window object instance capable of responding to the mouse or dragging operation through finger on the touch screen; the window object has its own interface attribute, method attribute and data attribute, and can respond to the triggering event of window interface. For instance, by taking the Window operating system for example, the window object may be a window for displaying contact information, and the window object has event function responding to click and moving operation of a user, and has interface attributes, such as Width, Height, a rotation angle with the center of window as center of a circle, horizontal coordinate (CenterX) of the center of window, and vertical coordinate (CenterY) of the center of window.

For describing conveniently, in the following description, the operation scenario is that the user moves, with his/her finger or a mouse, a window object instance (called a window object for short below, for describing conveniently) which represents an IM contact; when moving the window object at a certain speed, the user lifts his/her finger or releases mouse button suddenly, then the window object keeps moving and rotates along the original movement trail by the force of inertia, and slowly turns into a static state by the force of friction (deceleration).

For making the aim, technical solution and advantage of the present disclosure more clear, the present disclosure is described below with reference to the accompanying drawings and embodiments in detail.

Figure 1:
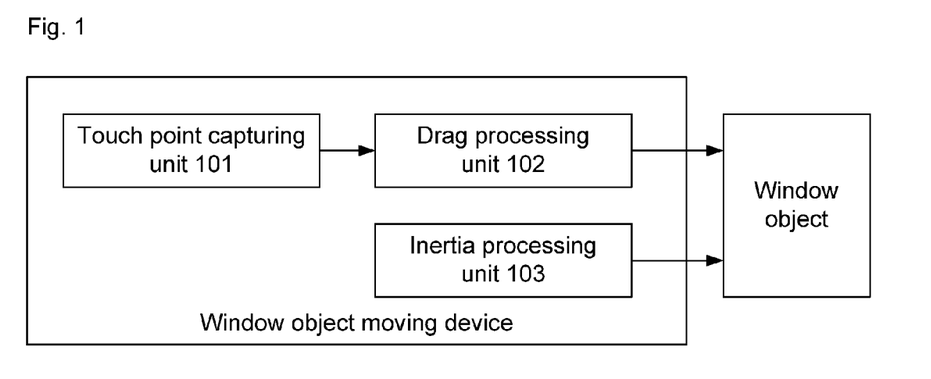
FIG. 1 shows a structural diagram of a device for realizing inertial movement effect of a window object according to the present disclosure.

FIG. 1 shows a structural diagram of a device for realizing inertial movement effect of a window object according to the present disclosure; the device includes a touch point capturing unit 101, a drag processing unit 102 and an inertia processing unit 103.

The touch point capturing unit 101 is configured to capture the operation that an input device drags a window object on a screen, and generate corresponding control information.

The input device includes touch screen, mouse, WordPad and so on, which can realize window movement.

The control information includes: (1) initial control information when the input device initially touches the window object, including position, time, device number, identity indicating initially touching the window object and so on; (2) current control information when the input device moves the window object, including position, time, device number, identity indicating dragging the window object and so on; (3) release control information when the input device releases the window object and ends dragging the window object, including position, time, device number, identity indicating releasing the window object and so on.

The touch point capturing unit 101 is an interface unit between the device of the present disclosure and the operating system; it monitors operation of the operating system on the window object in real time, obtains the control information generated by the input device, and sends the control information to the drag processing unit, which realizes the dragging effect of the window object.

For example, when the mouse is pressed and moved, or the finger presses and moves, the touch point capturing unit 101 captures the event that the mouse is pressed or the finger touches, and sends the initial control information to the drag processing unit 102, wherein the initial control information includes: position coordinate of the touch point, the current time, device number, identity indicating that the left mouse button is pressed or the finger presses for preparing to drag the window object and so on. The device number is used for distinguishing different input devices; under the condition of multi-point touch, for example, the user uses two fingers to touch the window object, the device numbers corresponding to fingers that come into contact with the touch screen at different time are different.

The drag processing unit 102 is configured to realize the dragging effect of the window object according to the control information sent from the touch point capturing unit 101.

The drag processing unit 102 includes: a first movement processing unit and an initial speed processing unit.

The first movement processing unit is configured to start a first timer Timer1 when receiving the initial control information sent from the touch point capturing unit 101, obtain, according to the current control information sent from the touch point capturing unit 101, the quantity of displacement and the quantity of rotation of the window object corresponding to the current period of the Timer1, under triggering of the Timer1, and send the obtained quantity of displacement and quantity of rotation to the window object.

The initial speed processing unit is configured to obtain the initial linear speed and the initial angular speed after receiving the release control information sent from the touch point capturing unit 101, and send the obtained initial linear speed and the initial angular speed to the inertia processing unit.

The method for realizing the dragging effect of the window object is specifically:

(1) after receiving the initial control information sent from the touch point capturing unit 101, the drag processing unit 102 records the position coordinate information $(X_0, Y_0)$ of the initial touch point, the initial touch time $T_0$ and the device number;

(2) when the mouse is moved after being pressed or the finger moves after pressing, the drag processing unit 102 records the position $(X_i, Y_i)$ of the mouse or the finger, the current time $T_i$ and the device number every period $\Delta t$, obtains the quantity of displacement and the quantity of rotation relative to the previous recording time point, and sends the relative quantity of displacement and relative quantity of rotation to the window object; and then the window object sets its own attribute value to realize the dragging effect;

for example, the center coordinate attribute of the window object is (CenterX, CenterY), and the rotation angle attribute is Angle; when the current quantity of displacement and quantity of rotation which are obtained by the window object during the $T_i$ period are $(\Delta X, \Delta Y)$ and $\alpha$, respectively, the window object sets its own attribute value of center coordinate and attribute value of rotation angle as:

CenterX=CenterX+$\Delta X$,

CenterY=CenterY+$\Delta Y$,

Angle=Angle+$\alpha$;

the window object triggers its interface redraw function by setting the attribute value of center coordinate and attribute value of rotation angle so as to display the window object at new coordinate position and new rotation angle;

(3) when the input device releases the window object, that is, when the mouse button is released or the finger lifts, the touch point capturing unit 101 sends the release control information to the drag processing unit 102; the drag processing unit 102 obtains the initial linear speed and the initial angular speed according to the quantity of displacement and the quantity of rotation which are obtained during the last period of the Timer1 before releasing;

There are two cases, i.e. the case of single-point touch and the case of multi-point touch, in obtaining the quantity of displacement, the quantity of rotation, the initial linear speed and the initial angular speed.

Figure 2:
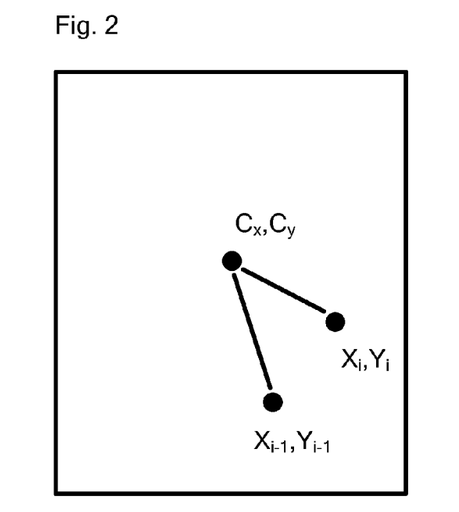
FIG. 2 shows a vector diagram of obtaining the quantity of displacement and the quantity of rotation under the condition of single touch point.

(1) As shown in FIG. 2, in the case of single-point touch, the method for obtaining the quantity of displacement, the quantity of rotation, the initial linear speed and the initial angular speed includes:

the quantity of displacement between $T_{i-1}$ $T_i$ and is: $(\Delta X, \Delta Y) = (X_i - X_{i-1}, Y_i - Y_{i-1})$, where $(X_i, Y_i)$ is the coordinate vector of the touch point corresponding to $T_i$ period of Timer1, and $(X_{i-1}, Y_{i-1})$ is the coordinate vector of the touch point corresponding to $T_{i-1}$ period of Timer1;

the quantity of rotation between $T_{i-1}$ and $T_i$ is: $\alpha = \arccos[u_i \cdot v_i/(|u_i||v_i|)]$;

wherein the rotation center coordinate is the center coordinate of the window object: $(C_x, C_y)$; $u_i$ is the vector between the touch point coordinate corresponding to $T_i$ period of Timer1 and the rotation center coordinate, namely $u_i = (X_i - C_x, Y_i - C_y)$; $v_i$ is the vector between the touch point coordinate corresponding to $T_{i-1}$ period of Timer1 and the rotation center coordinate, namely $v_i = (X_{i-1} - C_x, Y_{i-1} - C_y)$;

the initial linear speed V when the input device releases the window object is:

$$V = (X_n - X_{n-1}, Y_n - Y_{n-1})/(T_n - T_{n-1}) = (X_n - X_{n-1}, Y_n - Y_{n-1})/\Delta t,$$

where $(X_n, Y_n)$ is the coordinate vector of the touch point corresponding to the last period $T_n$ of Timer1 when the input device releases the window object; $(X_{n-1}, Y_{n-1})$ is the coordinate vector of the touch point corresponding to the $T_{n-1}$ period;

if $\Delta t$ is set as standard unit time, then the above equation can be simplified as:

$$V = (X_n - X_{n-1}, Y_n - Y_{n-1});$$

the method for obtaining the initial angular speed Va when the input device releases the window object is:

$$Va = \arccos[u_n \cdot v_n/(|u_n||v_n|)]/(T_n - T_{n-1}) = \arccos[u_n \cdot v_n/(|u_n||v_n|)]/\Delta t,$$

where $u_n$ is the vector between the touch point coordinate $(X_n, Y_n)$ corresponding to $T_n$ period of Timer1 and the rotation center coordinate $(C_x, C_y)$, namely $u_n = (X_n - C_x, Y_n - C_y)$, and $v_n$ is the vector between the touch point coordinate corresponding to $T_{n-1}$ period of Timer1 and the rotation center coordinate, namely $v_n = (X_{n-1} - C_x, Y_{n-1} - C_y)$;

if $\Delta t$ is set as standard unit time, then the above equation can be simplified as:

$$Va = \arccos[u_n \cdot v_n/(|u_n||v_n|)].$$

Figure 3:
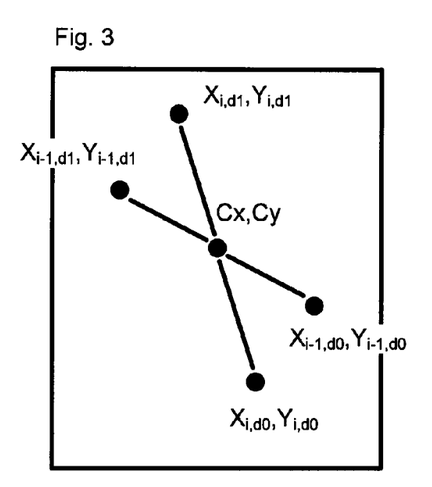
FIG. 3 shows a vector diagram of obtaining the quantity of displacement and the quantity of rotation under the condition of multiple touch points.

(2) As shown in FIG. 3, in the case of multi-point touch, only two touch points with the smallest device numbers are taken into consideration, the method for obtaining the quantity of displacement, the quantity of rotation, the initial linear speed and the initial angular speed includes:

supposing that the coordinates of two touch points with the smallest device numbers corresponding to $T_{i-1}$ period of Timer1 are $(X_{i-1,d0}, Y_{i-1,d0})$ and $(X_{i-1,d1}, Y_{i-1,d1})$, and the coordinates corresponding to $T_i$ period is $(X_{i,d0}, Y_{i,d0})$ and $(X_{i,d1}, Y_{i,d1})$, wherein d0 and d1 are device numbers, then the center coordinate vectors of the two touch points during $T_{i-1}$ period and $T_i$ period are respectively:

$$(CX_i, CY_i) = ((X_{i,d0} + X_{i,d1})/2, (Y_{i,d0} + Y_{i,d1})/2),$$

$$(CX_{i-1}, CY_{i-1}) = ((X_{i-1,d0} + X_{i-1,d1})/2, (Y_{i-1,d0} + Y_{i-1,d1})/2);$$

the quantity of displacement between $T_{i-1}$ and $T_i$ is:

$$(\Delta X, \Delta Y) = (CX_i - CX_{i-1}, CY_i - CY_{i-1});$$

when the input device releases the window object, the initial linear speed corresponding to $T_n$ period of Timer1 is:

$$V = (CX_n - CX_{n-1}, CY_n - CY_{n-1})/(T_n - T_{n-1}) = (CX_n - CX_{n-1}, CY_n - CY_{n-1})/\Delta t,$$

where $(X_n, CY_n)$ and $(CX_{n-1}, CY_{n-1})$ are the center coordinates of the vectors which are formed by two touch points with the smallest device numbers respectively during the last period $T_n$ and the $T_{n-1}$ period of Timer1 when the input device releases the window object; $\Delta t$ is the timing period of Timer1;

if $\Delta t$ is set as standard unit time, then the above equation can be simplified as:

$$V = (CX_n - CX_{n-1}, CY_n - CY_{n-1});$$

in the case of multi-point touch, when obtaining the quantity of rotation, only two touch points with the smallest device numbers are taken into consideration, the intersection point of a line connecting the two points during $T_{i-1}$ period with a line connecting the two touch points during $T_i$ period serves as the center for obtaining the quantity of rotation; the coordinates of two touch points corresponding to $T_i$ period are $(X_{i,d0}, Y_{i,d0})$ and $(X_{i,d1}, Y_{i,d1})$, and the coordinates of two touch points corresponding to $T_{i-1}$ period are $(X_{i-1,d0}, Y_{i-1,d0})$ and $(X_{i-1,d1}, Y_{i-1,d1})$;

the rotation center coordinate for obtaining the quantity of rotation is:

$$(Cx, Cy) = ((X_{i,d0} + X_{i,d1})/2, (Y_{i,d0} + Y_{i,d1})/2);$$

the quantity of rotation between $T_{i-1}$ and $T_i$ is: $\alpha_i = \arccos[u_i \cdot v_i/(|u_i||v_i|)]$, where $u_i$ is the vector $(X_{i,d0} - X_{i,d1}, Y_{i,d0} - Y_{i,d1})$ formed by two touch points with the smallest device numbers corresponding to $T_i$ period of Timer1, $v_i$ is the vector $(X_{i-1,d0} - X_{i-1,d1}, Y_{i-1,d0} - Y_{i-1,d1})$ formed by the two touch points with the smallest device numbers corresponding to $T_{i-1}$ period of Timer1.

When the input device releases the window object, the initial angular speed Va of the quantity of rotation corresponding to $T_n$ period of Timer1 is:

$$Va = \arccos[u_n \cdot v_n/(|u_n||v_n|)]/(T_n - T_{n-1}) = \arccos[u_n \cdot v_n/(|u_n||v_n|)]/\Delta t,$$

where $u_n$ is the vector $(X_{n,d0} - X_{n,d1}, Y_{n,d0} - Y_{n,d1})$ formed by the two touch points with the smallest device numbers corresponding to the last period $T_n$ of Timer1 when the input device releases the window object, and $v_n$ is the vector $(X_{n-1,d0} - X_{n-1,d1}, Y_{n-1,d0} - Y_{n-1,d1})$ formed by the two touch points with the smallest device numbers corresponding to $T_{n-1}$ period.

If $\Delta t$ is set as standard unit time, then the above equation can be simplified as:

$$Va = \arccos[u_n \cdot v_n/(|u_n||v_n|)].$$

The inertia processing unit 103 is configured to realize the inertial movement effect after the input device releases the window object, that is, after the user ends the dragging operation. After receiving the release control information sent from the drag processing unit 102, the inertia processing unit 103 starts a second timer Timer2 to trigger a timer processing function every period of time Tg, obtains, according to the initial linear speed and the initial angular speed corresponding to current period of Timer2, the quantity of displacement and the quantity of rotation during the current period in the timer processing function, and then sends the obtained quantity of displacement and the quantity of rotation during the current period to the window object; then the window object sets its own attribute to realize the inertial movement effect.

The method for obtaining the initial linear speed corresponding to $T_i$ period of Timer2 includes:

$$V_i = V_{i-1} - V_{dec} * Tg,$$

where $V_{dec}$ is the deceleration of linear speed, and may be preset by a user or a system according to actual situation, which is equivalent to adjusting the friction coefficient of the linear speed; in a first period of Timer2 after the input device releases the window object, $V_1$ is the initial linear speed V sent by the drag processing unit 102; Tg is the period of Timer2, and may be preset by the user or the system.

The method for obtaining the initial angular speed corresponding to $T_i$ period of Timer2 includes:

$$Va_i = Va_{i-1} - Va_{dec} * Tg,$$

where $Va_{dec}$ is the deceleration of angular speed, and may be preset by a user or a system according to actual situation, which is equivalent to adjusting the friction coefficient of the angular speed; in a first period of Timer2 after the input device releases the window object, $Va_1$ is the initial angular speed Va sent by the drag processing unit 102;

the quantity of displacement corresponding to $T_i$ period of Timer2 is:

$$(\Delta X, \Delta Y) = (V_i - V_{dec} * Tg) * Tg = (V_i \cdot X - V_{dec} * Tg, V_i \cdot Y - V_{dec} * Tg) * Tg,$$

where $V_i$ is the initial linear speed vector corresponding to $T_i$ period of Timer2, and Tg is the timing period of Timer2;

the quantity of rotation corresponding to $T_i$ period of Timer2 is:

$$\alpha_i = (Va_i - Va_{dec} * Tg) * Tg,$$

where $Va_i$ is the initial angular speed corresponding to $T_i$ period of Timer2;

if Tg is equal to $\Delta t$, and $\Delta t$ is set as standard unit time, then the above equation can be simplified as:

$$(\Delta X, \Delta Y) = (V_i \cdot X - V_{dec}, V_i \cdot Y - V_{dec}),$$

$$\alpha_i = (Va_i - Va_{dec}),$$

that is, if Tg=$\Delta t$ serves as unit time of sampling speed, processing inertia and updating position of window object, then the quantity of calculation can be greatly reduced.

When the quantity of displacement and quantity of rotation of the inertial movement of window object during current period, which are obtained through the above equation, are less than or equal to 0, the inertia process is ended.

After receiving the quantity of displacement and the quantity of rotation sent by the inertia processing unit 103, the window object sets its own attribute value of center coordinate and attribute value of rotation angle as:

Center.$X$=Center.$X$+$\Delta X$,

Center.$Y$=Center.$Y$+$\Delta Y$,

Angle=Angle+$\alpha$.

The interface redraw function is triggered by setting the attribute value of center coordinate and attribute value of rotation angle so as to display the window object at new coordinate position and new rotation angle, thereby realizing the inertial movement effect.

Figure 4:
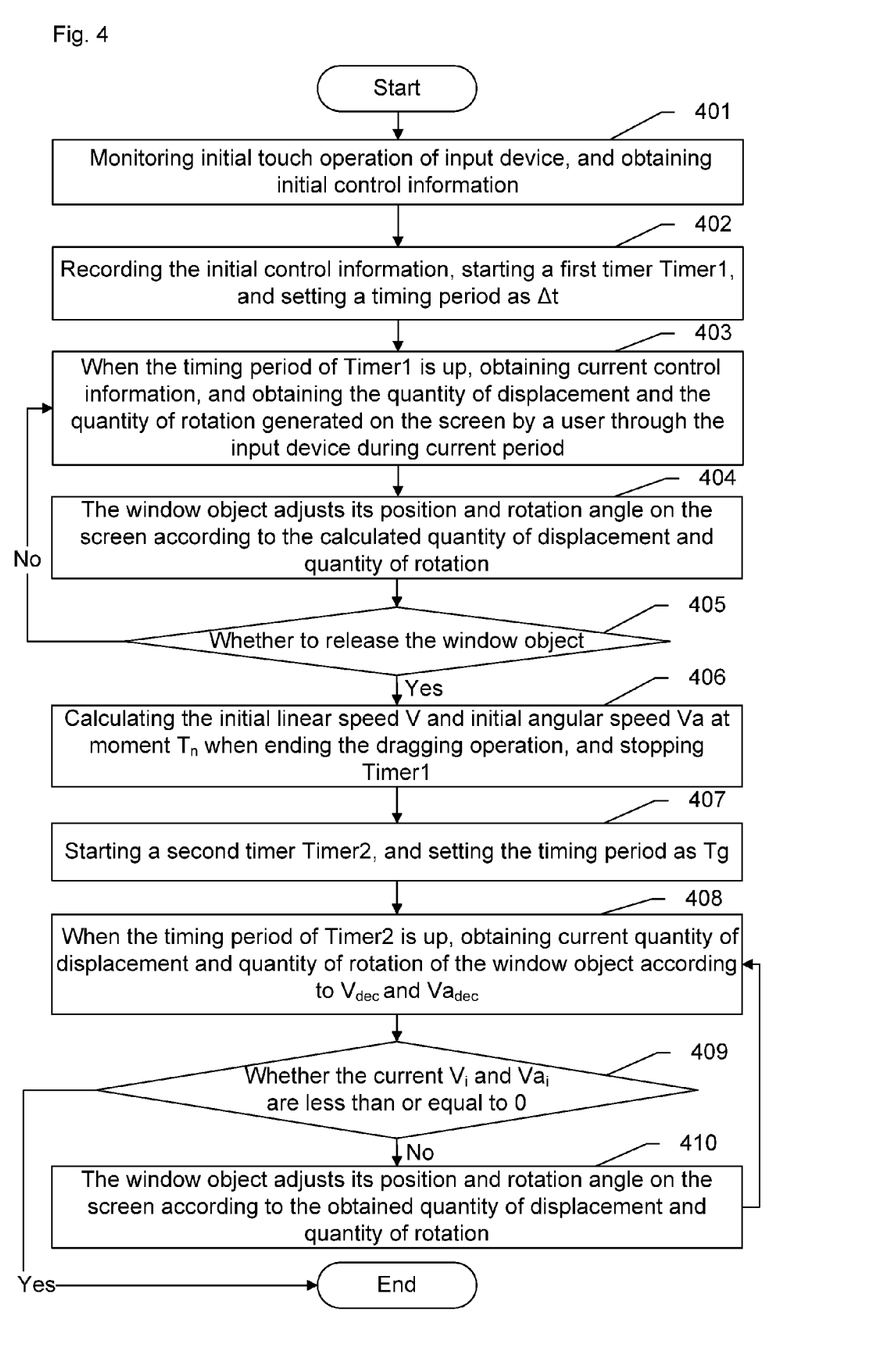
FIG. 4 shows a flowchart of a method for moving a window object according to the present disclosure.

FIG. 4 shows a flowchart of a method for moving a window object according to the present disclosure, including the following steps.

Step 401: monitoring the initial touch operation of the input device, and obtaining the initial control information.

In the step, the initial touch operation of the input device is monitored by the touch point capturing unit, and the touch point capturing unit sends the initial control information to the drag processing unit after detecting the initial touch operation.

The input device comprises mouse, touch screen, wordpad and so on, which have the function of moving the window object. If the input devices are different, then the generated system messages are different. For example, the system message indicating that the mouse triggers the window object to move may be that the left mouse button is pressed and the mouse is moved; the system message indicating that the touch screen triggers the window object to move is that the finger presses and moves.

The initial touch operation refers to a click operation that a user initially presses the left mouse button, or the finger initially presses on the touch screen to move the window object.

The initial control information includes: position of the initial touch point, time, device number, code of button and so on.

Step 402: recording the initial control information, starting a first timer Timer1, setting a timing period as $\Delta t$, wherein $\Delta t$ is preset by a user or a system according to actual situation.

After receiving the initial control information sent from the touch point capturing unit, the drag processing unit records the initial control information and starts the Timer1. The Timer1 is used for periodically triggering an event function for calculating the quantity of displacement ($\Delta X, \Delta Y$) and the quantity of rotation a of the window object, so as to obtain the quantity of displacement and the quantity of rotation generated on the screen by the input device during current period.

Step 403: when the timing period of Timer1 is up, obtaining current control information, and obtaining the quantity of displacement and the quantity of rotation generated on the screen by a user through the input device during current period.

The precondition for executing the step is that the user maintains pressing operation of the input device, and immobilizes or drags the window object; the touch point capturing unit transforms the monitored system message generated by the input device into current control information (including position, time, device number and so on) and continuously sends the current control information to the drag processing unit; the drag processing unit updates local cached current control information in real time, and records the current control information when each timing period of Timer1 is up to form a history of the control information; the history can reflect the trail, which can also be called gesture, of movement of the input device on the screen, and then the quantity of displacement and quantity of rotation of the window object corresponding to the current period of Timer1 are obtained.

Step 404: the window object adjusts its position and rotation angle on the screen according to the obtained quantity of displacement and quantity of rotation.

After obtaining the quantity of displacement and quantity of rotation at current time point, the drag processing unit sends them to the window object; the window object triggers a window redraw method by setting its own center coordinate and the attribute value of rotation angle relative to the center coordinate, so as to realize the dragging effect.

Step 405: determining whether the input device releases the window object, that is, whether the user releases the mouse button or lifts his/her finger to end the dragging operation, if so, executing Step 406, otherwise, executing Step 403.

In the step, it is the touch point capturing unit monitoring whether the input device releases the window object. After the release information is detected, the touch point capturing unit sends release control information to the drag processing unit immediately, wherein the release control information includes: position at the release moment, time, device number and so on.

Step 406: when ending the dragging operation, obtaining the initial linear speed V and initial angular speed Va corresponding to the last period $T_n$ of Timer1, and stopping Timer1.

The drag processing unit obtains, according to the history of control information, the initial linear speed V and initial angular speed Va corresponding to the last period $T_n$ of Timer1 when the input device releases the window object; the obtaining method is described above, and will not be repeated here; the drag processing unit sends the obtained initial linear speed V and initial angular speed Va to the inertia processing unit.

Step 407: starting a second timer Timer2, and setting the timing period as Tg.

In the step, after receiving the V and Va, the inertia processing unit starts the second timer Timer2, wherein the Timer2 is used for realizing the inertial movement effect after the input device releases the window object.

Step 408: when each timing period of Timer2 is up, obtaining current quantity of displacement and quantity of rotation of the window object according to the deceleration of linear speed $V_{dec}$ and the deceleration of angular speed $Va_{dec}$, recording position at present moment, and calculating the initial linear speed V and initial angular speed Va for a next timing period.

In the step, the inertia processing unit obtains, according to the preset $V_{dec}$ and $Va_{dec}$, the quantity of displacement and quantity of rotation used for keeping on moving forwards in the current timing period of Timer2 after the input device releases the window object; the obtaining method is described above, and will not be repeated here.

The method for obtaining the initial linear speed V and initial angular speed Va for the next timing period of Timer2 is:

$$V_i = V_{i-1} - V_{dec} * Tg; \ Va_i = Va_{i-1} - Va_{dec} * Tg.$$

Step 409: determining whether the inertial movement ends; if so, ending the process, otherwise, executing Step 410.

The step of determining whether the inertial movement ends includes: determining whether $V_i$ and $Va_i$ obtained in Step 408 are less than or equal to 0; if so, stopping Timer2, and ending the inertial movement process; if one value is less than or equal to 0, and the other value is still greater than 0, then it still needs to perform inertia process on the other value; for example, when $V_i$ is less than or equal to 0 and $Va_i$ is greater than 0, in current period and a following period of Timer2, the quantity of displacement is 0, and the quantity of rotation is not 0; the inertial movement process is not ended until both of $V_i$ and $Va_i$ are less than or equal to 0.

Step 410: the window object adjusts its position and rotation angle on the screen according to the obtained quantity of displacement and quantity of rotation, so as to realize the inertial movement effect; then Step 408 is executed again.

The above is only preferable embodiments of the present disclosure, and not used for limiting the protection scope of the present disclosure.

What is claimed is:

1. A method for inertial movement of a window object, comprising:
   A: monitoring initial touch operation of an input device, recording initial touch coordinate and touch time, and starting a first timer;
   B: in the process of dragging the window object, periodically triggering, by the first timer, an event of obtaining quantity of displacement and quantity of rotation that are generated on a screen by a user through the input device relative to a previous time point, and sending the obtained quantity of displacement and quantity of rotation to the window object;
   C: when the user releases the window object, obtaining initial linear speed and initial angular speed of the window object, and starting a second timer;
   D: based on the initial linear speed and the initial angular speed, periodically triggering, by the second timer, an event of obtaining current quantity of displacement and quantity of rotation of the window object according to deceleration of linear speed and deceleration of angular speed, and sending the obtained current quantity of displacement and quantity of rotation to the window object;
   E: when the initial linear speed and the initial angular speed corresponding to current period of the second timer are less than or equal to 0, terminating the process of inertial movement of the window object,
   wherein obtaining the current quantity of displacement and quantity of rotation of the window object according to the deceleration of linear speed and the deceleration of angular speed in Step D is:
   quantity of displacement corresponding to $T_i$ period of the second timer is: $(\Delta X, \Delta Y) = (V_i - V_{dec} * Tg) * Tg$;
   quantity of rotation corresponding to $T_i$ period of the second timer is: $\alpha_i = (Va_i - Va_{dec} * Tg) * Tg$;
   where $V_{dec}$ is the deceleration of linear speed, $Va_{dec}$ is the deceleration of angular speed; $V_i$ is initial linear speed corresponding to $T_i$ period of the second timer; $Va_i$ is initial angular speed corresponding to $T_i$ period of the second timer; Tg is a timing period of the second timer; an initial linear speed and an initial angular speed corresponding to a first period of the second timer after the input device releases the window object are the ones obtained in Step C respectively.

2. The method according to claim 1, wherein the user drags, with one or multiple touch points, the window object through the input device;
   in the case of multiple touch points, the quantity of displacement and the quantity of rotation is obtained based on two touch points with smallest device numbers.

3. A method for inertial movement of a window object, comprising:
   A: monitoring initial touch operation of an input device, recording initial touch coordinate and touch time, and starting a first timer;
   B: in the process of dragging the window object, periodically triggering, by the first timer, an event of obtaining quantity of displacement and quantity of rotation that are generated on a screen by a user through the input device relative to a previous time point, and sending the obtained quantity of displacement and quantity of rotation to the window object;
   C: when the user releases the window object, obtaining initial linear speed and initial angular speed of the window object, and starting a second timer;
   D: based on the initial linear speed and the initial angular speed, periodically triggering, by the second timer, an event of obtaining current quantity of displacement and quantity of rotation of the window object according to deceleration of linear speed and deceleration of angular speed, and sending the obtained current quantity of displacement and quantity of rotation to the window object;

E: when the initial linear speed and the initial angular speed corresponding to current period of the second timer are less than or equal to 0, terminating the process of inertial movement of the window object, wherein the user drags, with one or multiple touch points, the window object through the input device;

in the case of multiple touch points, the quantity of displacement and the quantity of rotation is obtained based on two touch points with smallest device numbers, wherein in the case of single touch point, obtaining the quantity of displacement and the quantity of rotation in Step B is:

quantity of displacement between $T_{i-1}$ and $T_i$ is: $(\Delta X, \Delta Y) = (X_i - X_{i-1}, Y_i - Y_{i-1})$, where $(X_i, Y_i)$ is a coordinate vector of a touch point corresponding to $T_i$ period of the first timer, and $(X_{i-1}, Y_{i-1})$ is a coordinate vector of a touch point corresponding to $T_{i-1}$ period of the first timer;

quantity of rotation between $T_{i-1}$ and $T_i$ is: $\alpha_i = \arccos [u_i \cdot v_i / (|u_i||v_i|)]$;

wherein a rotation center coordinate is a center coordinate of the window object: $(C_x, C_y)$; $u_i$ is a vector between the touch point coordinate corresponding to $T_i$ period of the first timer and the rotation center coordinate, namely $u_i = (X_i - C_x, Y_i - C_y)$; $v_i$ is a vector between the touch point coordinate corresponding to $T_{i-1}$ period of the first timer and the rotation center coordinate, namely $v_i = (X_{i-1} - C_x, Y_{i-1} - C_y)$;

obtaining the initial linear speed V and the initial angular speed Va in Step C is:

$V = (X_n - X_{n-1}, Y_n - Y_{n-1})/(T_n - T_{n-1}) = (X_n - X_{n-1}, Y_n - Y_{n-1})/\Delta t$, where $(X_n, Y_n)$ is a coordinate vector of a touch point corresponding to a last period $T_n$ of the first timer when the input device releases the window object; $(X_{n-1}, X_{n-1})$ is a coordinate vector of a touch point corresponding to $T_{n-1}$ period; $\Delta t$ is a timing period of the first timer;

$Va = \arccos [u_n \cdot v_n/(|u_n||v_n|)]/(T_n - T_{n-1}) = \arccos [u_n \cdot v_n/(|u_n||v_n|)]/\Delta t$, where $u_n$ is a vector between the touch point coordinate $(X_n, Y_n)$ corresponding to $T_n$ period of the first timer and the rotation center coordinate $(C_x, C_y)$, namely $u_n = (X_n - C_x, Y_n - C_y)$, when the input device releases the window object; and $v_n$ is a vector between the touch point coordinate corresponding to $T_{n-1}$ period of the first timer and the rotation center coordinate, namely $v_n = (X_{n-1} - C_x, Y_{n-1} - C_y)$.

4. A method for inertial movement of a window object, comprising:

A: monitoring initial touch operation of an input device, recording initial touch coordinate and touch time, and starting a first timer;

B: in the process of dragging the window object, periodically triggering, by the first timer, an event of obtaining quantity of displacement and quantity of rotation that are generated on a screen by a user through the input device relative to a previous time point, and sending the obtained quantity of displacement and quantity of rotation to the window object;

C: when the user releases the window object, obtaining initial linear speed and initial angular speed of the window object, and starting a second timer;

D: based on the initial linear speed and the initial angular speed, periodically triggering, by the second timer, an event of obtaining current quantity of displacement and quantity of rotation of the window object according to deceleration of linear speed and deceleration of angular speed, and sending the obtained current quantity of displacement and quantity of rotation to the window object;

E: when the initial linear speed and the initial angular speed corresponding to current period of the second timer are less than or equal to 0, terminating the process of inertial movement of the window object, wherein the user drags, with one or multiple touch points, the window object through the input device;

in the case of multiple touch points, the quantity of displacement and the quantity of rotation is obtained based on two touch points with smallest device numbers, wherein in the case of multiple touch points, obtaining the quantity of displacement and the quantity of rotation in Step B is:

quantity of displacement between $T_{i-1}$ and $T_i$ is: $(\Delta X, \Delta Y) = (CX_i - CX_{i-1}, CY_i - CY_{i-1})$, where $(CX_i, CY_i)$ and $(CX_{i-1}, CY_{i-1})$ are center coordinates of two touch points with smallest device numbers corresponding respectively to $T_i$ period and $T_{i-1}$ period of the first timer;

quantity of rotation between $T_{i-1}$ and $T_i$ is: $\alpha_i = \arccos [u_i \cdot v_i/(|u_i||v_i|)]$, where $u_i$ is a vector formed by the two touch points with the smallest device numbers corresponding to $T_i$ period of the first timer, $v_i$ is a vector formed by the two touch points with the smallest device numbers corresponding to $T_{i-1}$ period of the first timer;

obtaining V and Va in Step C is:

$V = (CX_n - CX_{n-1}, CY_n - CY_{n-1})/(T_n - T_{n-1}) = (CX_n - CX_{n-1}, CY_n - CY_{n-1})/\Delta t$, where $(CX_n, CY_n)$ and $(CX_{n-1}, CY_{n-1})$ are center coordinates of vectors which are formed by the two touch points with the smallest device numbers respectively during a last period $T_n$ and $T_{n-1}$ period of the first timer, when the input device releases the window object; $\Delta t$ is a timing period of the first timer;

$Va = \arccos [u_n \cdot v_n/(|u_n||v_n|)]/(T_n - T_{n-1}) = \arccos [u_n \cdot v_n/(|u_n||v_n|)]/\Delta t$, where $u_n$ is a vector formed by the two touch points with the smallest device numbers corresponding to the last period $T_n$ of the first timer when the input device releases the window object, and $v_n$ is a vector formed by the two touch points with the smallest device numbers corresponding to $T_{n-1}$ period.

5. A device for inertial movement of a window object, comprising:

a touch point capturing unit, configured to capture operation that an input device drags the window object on a screen, and generate corresponding control information;

a drag processing unit, configured to realize dragging effect of the window object according to the control information sent from the touch point capturing unit, obtain initial linear speed and initial angular speed when the input device releases the window object, and send the obtained initial linear speed and the initial angular speed to an inertia processing unit; and the inertia processing unit, configured to, based on the initial linear speed and the initial angular speed sent from the drag processing unit, realize inertial movement effect according to deceleration of linear speed and deceleration of angular speed, wherein the drag processing unit comprises:
a first movement processing unit, configured to start a first timer when receiving the initial control information sent from the touch point capturing unit, obtain, according to the current control information sent from the touch point capturing unit, quantity of displacement and quantity of rotation of the window object corresponding to current period of the first timer under triggering of the first timer, and send the obtained quantity of displacement and quantity of rotation to the window object; and
an initial speed processing unit, configured to obtain the initial linear speed and the initial angular speed after receiving the release control information sent from the touch point capturing unit, and send the obtained initial linear speed and initial angular speed to the inertia processing unit,
wherein
in the case of single touch point,
the first movement processing unit obtains the quantity of displacement and the quantity of rotation through the following way:
quantity of displacement $T_{i-1}$ and $T_i$ is: $(\Delta X, \Delta Y) = (X_i - X_{i-1}, Y_i - Y_{i-1})$,
wherein, $(X_i, Y_i)$ is a coordinate vector of a touch point corresponding to $T_i$ period of the first timer and $(X_{i-1}, Y_{i-1})$ is a coordinate vector of a touch point corresponding to $T_{i-1}$ period of the first timer;
quantity of rotation between $T_{i-1}$ and $T_i$ is: $\alpha_i = \arccos [u_i \cdot v_i / (|u_i||v_i|)]$;
wherein a rotation center coordinate is a center coordinate of the window object: $(C_x, C_y)$; $u_i$ is a vector between the touch point coordinate corresponding to $T_i$ period of the first timer and the rotation center coordinate, namely $u_i = (X_i - C_x, Y_i - C_y)$; $v_i$ is a vector between the touch point coordinate corresponding to $T_{i-1}$ period of the first timer and the rotation center coordinate, namely $v_i = (X_{i-1} - C_x, Y_{i-1} - C_y)$;
the initial speed processing unit obtains the initial linear speed V and the initial angular speed Va through the following way:

$$V = (X_n - X_{n-1}, Y_n - Y_{n-1}) / (T_n - T_{n-1}) = (X_n - X_{n-1}, Y_n - Y_{n-1}) / \Delta t,$$

where $(X_n, Y_n)$ is a coordinate vector of a touch point corresponding to a last period $T_n$ of the first timer when the input device releases the window object; $(X_{n-1}, Y_{n-1})$ is a coordinate vector of a touch point corresponding to $T_{n-1}$ period; $\Delta t$ is a timing period of the first timer;

$$Va = \arccos [u_n \cdot v_n / (|u_n||v_n|)] / (T_n - T_{n-1}) = \arccos [u_n \cdot v_n / (|u_n||v_n|)] / \Delta t,$$

where $u_n$ is a vector between the touch point coordinate $(X_n, Y_n)$ corresponding to $T_n$ period of the first timer and the rotation center coordinate $(C_x, C_y)$, namely $u_n = (X_n - C_x, Y_n - C_y)$ when the input device releases the window object; and $v_n$ is a vector between the touch point coordinate corresponding to $T_{n-1}$ period of the first timer and the rotation center coordinate, namely $v_n = (X_{n-1} - C_x, Y_{n-1} - C_y)$;
in the case of multiple touch points,
the first movement processing unit obtains the quantity of displacement and the quantity of rotation through the following way:
the quantity of displacement between $T_{i-1}$ and $T_i$ is: $(\Delta X, \Delta Y) = (CX_i - CX_{i-1}, CY_i - CY_{i-1})$,
where $(CX_i, CY_i)$ and $(CX_{i-1}, CY_{i-1})$ are center coordinates of two touch points with smallest device numbers corresponding respectively to $T_i$ period and $T_{i-1}$ period of the first timer;
the quantity of rotation between $T_{i-1}$ and $T_i$ is: $\alpha_i = \arccos [u_i \cdot v_i / (|u_i||v_i|)]$,
where $u_i$ is a vector formed by the two touch points with the smallest device numbers corresponding to $T_i$ period of the first timer, $v_i$ is a vector formed by the two touch points with the smallest device numbers corresponding to $T_{i-1}$ period of the first timer;
the initial speed processing unit obtains the initial linear speed V and the initial angular speed Va through the following way:

$$V = (CX_n - CX_{n-1}, CY_n - CY_{n-1}) / (T_n - T_{n-1}) = (CX_n - CX_{n-1}, CY_n - CY_{n-1}) / \Delta t$$

where $(CX_n, CY_n)$ and $(CX_{n-1}, CY_{n-1})$ are center coordinates of vectors which are formed by the two touch points with the smallest device numbers respectively during a last period $T_n$ and $T_{n-1}$ period of the first timer, when the input device releases the window object; $\Delta t$ is a timing period of the first timer;

$$Va = \arccos [u_n \cdot v_n / (|u_n||v_n|)] / (T_n - T_{n-1}) = \arccos [u_n \cdot v_n / (|u_n||v_n|)] \Delta t,$$

where $u_n$ is a vector formed by the two touch points with the smallest device numbers corresponding to the last period $T_n$ of the first timer, when the input device releases the window object, and $v_n$ is a vector formed by the two touch points with the smallest device numbers corresponding to $T_{n-1}$ period.

6. The device according to claim 5, wherein the control information generated by the touch point capturing unit comprises:
initial control information when the input device initially touches the window object, comprising position, time, device number, and identity indicating initially touching the window object;
current control information when the input device moves the window object, comprising position, time, device number, and identity indicating dragging the window object;
release control information when the input device releases the window object, comprising position, time, device number, and identity indicating releasing the window object.

7. The method according to claim 3, wherein obtaining the current quantity of displacement and quantity of rotation of the window object according to the deceleration of linear speed and the deceleration of angular speed in Step D is:
quantity of displacement corresponding to $T_i$ period of the second timer is: $(\Delta X, \Delta Y) = (V_i - V_{dec} * Tg) * Tg$;
quantity of rotation corresponding to $T_i$ period of the second timer is: $\alpha_i = (Va_i - Va_{dec} * Tg) * Tg$;
where $V_{dec}$ is the deceleration of linear speed, $Va_{dec}$ is the deceleration of angular speed; $V_i$ is initial linear speed corresponding to $T_i$ period of the second timer; $Va_i$ is initial angular speed corresponding to $T_i$ period of the second timer; Tg is a timing period of the second timer; an initial linear speed and an initial angular speed corresponding to a first period of the second timer after the input device releases the window object are the ones obtained in Step C respectively.

8. The method according to claim 4, wherein obtaining the current quantity of displacement and quantity of rotation of the window object according to the deceleration of linear speed and the deceleration of angular speed in Step D is:
quantity of displacement corresponding to $T_i$ period of the second timer is: $(\Delta X, \Delta Y) = (V_i - V_{dec} * Tg) * Tg$;
quantity of rotation corresponding to $T_i$ period of the second timer is: $\alpha_i = (Va_i - Va_{dec} * Tg) * Tg$;

where $V_{dec}$ is the deceleration of linear speed, $Va_{dec}$ is the deceleration of angular speed; $V_i$ is initial linear speed corresponding to $T_i$ period of the second timer; $Va_i$ is initial angular speed corresponding to $T_i$ period of the second timer; Tg is a timing period of the second timer; an initial linear speed and an initial angular speed corresponding to a first period of the second timer after the input device releases the window object are the ones obtained in Step C respectively.

9. A device for inertial movement of a window object, comprising:

a touch point capturing unit, configured to capture operation that an input device drags the window object on a screen, and generate corresponding control information;

a drag processing unit, configured to realize dragging effect of the window object according to the control information sent from the touch point capturing unit, obtain initial linear speed and initial angular speed when the input device releases the window object, and send the obtained initial linear speed and the initial angular speed to an inertia processing unit; and the inertia processing unit, configured to, based on the initial linear speed and the initial angular speed sent from the drag processing unit, realize inertial movement effect according to deceleration of linear speed and deceleration of angular speed wherein the drag processing unit comprises:

a first movement processing unit, configured to start a first timer when receiving the initial control information sent from the touch point capturing unit, obtain, according to the current control information sent from the touch point capturing unit, quantity of displacement and quantity of rotation of the window object corresponding to current period of the first timer under triggering of the first timer, and send the obtained quantity of displacement and quantity of rotation to the window object; and an initial speed processing unit, configured to obtain the initial linear speed and the initial angular speed after receiving the release control information sent from the touch point capturing unit, and send the obtained initial linear speed and initial angular speed to the inertia processing unit, wherein the inertia processing unit obtains the current quantity of displacement and quantity of rotation of the window object according to the deceleration of linear speed and the deceleration of angular speed through the following way:

quantity of displacement corresponding to $T_i$ period of a second timer is: $(\Delta X, \Delta Y) = (V_i - V_{dec} * Tg) * Tg$;

quantity of rotation corresponding to $T_i$ period of the second timer is: $\alpha_i = (Va_i - Va_{dec} * Tg) * Tg$;

where $V_{dec}$ is the deceleration of linear speed, $Va_{dec}$ is the deceleration of angular speed; $V_i$ is an initial linear speed corresponding to $T_i$ period of the second timer; $Va_i$ is initial angular speed corresponding to $T_i$ period of the second timer; Tg is a timing period of the second timer; an initial linear speed and an initial angular speed corresponding to a first period of the second timer after the input device releases the window object are the ones sent by the drag processing unit respectively.

* * * * *